(12) United States Patent
Schmidt et al.

(10) Patent No.: US 8,482,819 B2
(45) Date of Patent: Jul. 9, 2013

(54) SEGMENTED REFLECTIVE OPTICAL SYSTEM

(71) Applicant: Hewlett-Packard Development Company, L.P., Houston, TX (US)

(72) Inventors: Jack H Schmidt, San Diego, CA (US); John Herman Arterberry, San Diego, CA (US); Dennis J Schissler, San Diego, CA (US); Mark W Majette, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/686,565

(22) Filed: Nov. 27, 2012

(65) Prior Publication Data

US 2013/0083414 A1 Apr. 4, 2013

Related U.S. Application Data

(62) Division of application No. 12/375,121, filed as application No. PCT/US2006/028889 on Jul. 26, 2006, now Pat. No. 8,345,325.

(51) Int. Cl.
*H04N 1/04* (2006.01)

(52) U.S. Cl.
USPC .................... 358/475; 358/474; 358/488

(58) Field of Classification Search
USPC .............. 358/474, 475, 497, 496, 488, 448, 358/513, 514
See application file for complete search history.

(56) References Cited

U.S. PATENT DOCUMENTS

| | | | |
|---|---|---|---|
| 4,691,114 A | | 9/1987 | Hasegawa et al. |
| 4,916,721 A | * | 4/1990 | Carr et al. ................ 378/84 |
| 5,390,032 A | * | 2/1995 | Yamamoto et al. .......... 358/474 |
| 5,724,830 A | * | 3/1998 | Otis et al. .................. 62/509 |
| 5,751,341 A | * | 5/1998 | Chaleki et al. ............... 348/65 |
| 5,800,341 A | * | 9/1998 | McKenna et al. ............ 600/109 |
| 5,825,534 A | | 10/1998 | Strahle |
| 6,181,441 B1 | | 1/2001 | Walsh |
| 6,226,636 B1 | | 5/2001 | Abdel-Mottale et al. |
| 6,398,428 B1 | | 6/2002 | Szajewski et al. |
| 6,521,908 B2 | | 2/2003 | Isoda et al. |
| 7,333,248 B2 | | 2/2008 | Tseng et al. |
| 2002/0154215 A1 | | 10/2002 | Schechterman et al. |
| 2003/0007198 A1 | | 1/2003 | Ogata |
| 2003/0030923 A1 | | 2/2003 | Hsu et al. |
| 2008/0158344 A1 | | 7/2008 | Schechterman et al. |

FOREIGN PATENT DOCUMENTS

| EP | 0959617 A | 11/1999 |
|---|---|---|
| EP | 1239655 A2 | 11/2002 |
| GB | 2398954 A | 9/2004 |

OTHER PUBLICATIONS

International Search Report for corresponding PCT/US2006/028889 issued by EPO on May 8, 2007.

\* cited by examiner

*Primary Examiner* — Negussie Worku (57) ABSTRACT

An optical system, used for scanning, forms an image using reflective optical surfaces. The system may be telecentric, and may form an image that is reduced in size as compared with the scanned original. Several image-forming optical channels may be combined to form a page-wide scanning array.

10 Claims, 11 Drawing Sheets

PRIOR ART

FIG. 1

PRIOR ART

SEGMENTED REFLECTIVE OPTICAL SYSTEM

RELATED APPLICATIONS

The present invention is a divisional application of and claims prioriy from U.S. patent application ser. No. 12/375,121, filed 26 Jan. 2009, which is a U.S. National Stage under 35 USC 371 application of PCT/US2006/028889, filed 26 Jul. 2006, both of which are herein incorporated by reference in their entirety.

FIELD OF THE INVENTION

The present invention relates to image scanning.

BACKGROUND

Figure 1:
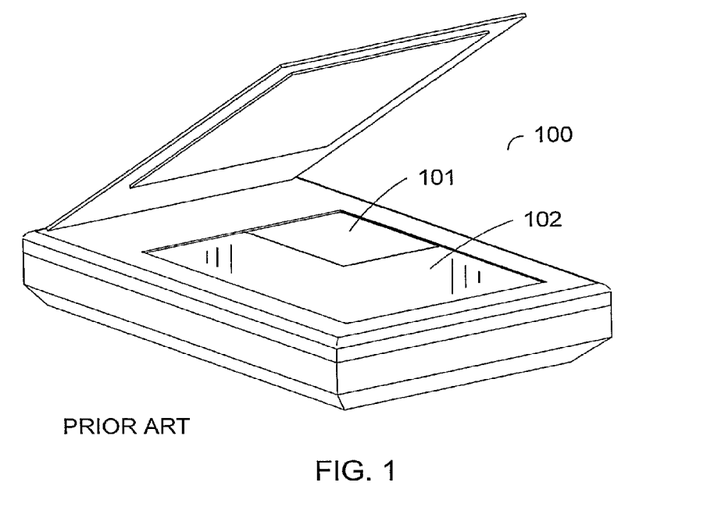
FIG. 1 shows a typical flatbed scanner.
Figure 2:
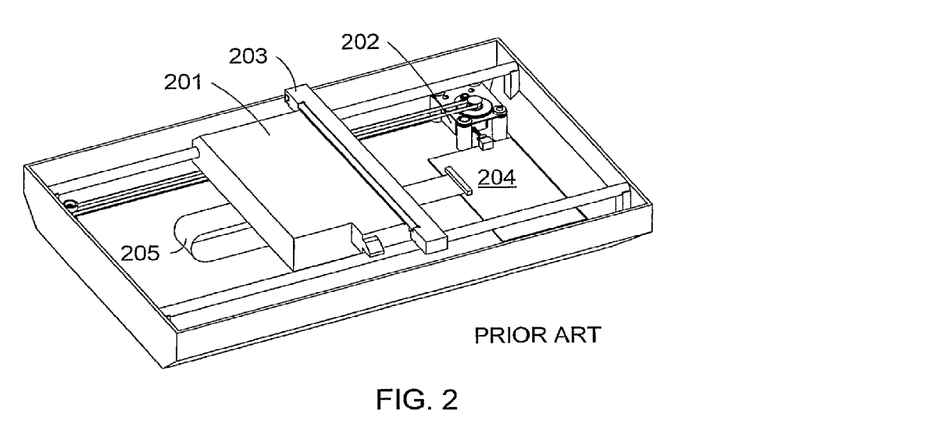
FIG. 2 shows one conventional scanner architecture.

FIG. 1 shows a typical flatbed scanner 100. In operation, an original item 101, such as a photograph or document, is placed on platen 102. The scanner constructs a digital image of the original item. A digital image is an ordered array of numerical values representing the brightness, color or both of locations on the original item. When the digital image is properly interpreted and displayed, a representation of the original item is recovered. FIG. 2 shows one conventional internal architecture of scanner 100. A carriage 201 containing optics and sensor electronics is swept beneath platen 102 by motor 202. Light generated by lamp assembly 203 reflects off of original item 101 and into carriage 201, where the distribution and intensity of the reflected light is sensed. Typically, lamp assembly 203 illuminates a narrow strip of original item 101, and the light is sensed one line or a few lines at a time as carriage 201 moves under platen 102. Digital values representing the light distribution and intensity are generated by electronics inside carriage 201 working in concert with electronics on controller 204. Carriage 201 and controller 204 are connected by cable 205. The resulting digital data is typically transmitted to a computer for storage, editing, or other uses.

Figure 3:
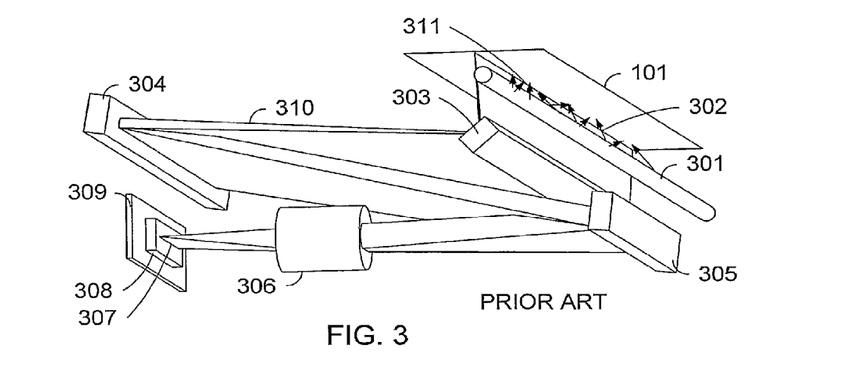
FIG. 3 shows one type of conventional scanner optical path.

FIG. 3 shows one type of conventional optical path that may be used inside of carriage 201. (The structure of carriage 201 has been removed for clarity.) Light 311 from lamp 301 reflects from original item 101. Light from a narrow "scan line" 302 finds its way into carriage 201, reflects from a series of mirrors 303, 304, and 305, and is gathered by lens 306. Light path 310 indicates the volume swept by the image-forming light. The light is redirected by lens 306 to form an image 307 of scan line 302 on a sensor 308.

Sensor 308 typically comprises one or more rows of photosensitive sites, sometimes called photosites or pixels, and a set of charge coupled devices (CCDs) for storing electric charges generated when light impinges on the photosites. As such, sensor 308 is typically called a CCD sensor, or simply a CCD. CCD 308 is mounted on a printed circuit board 309. The system of FIG. 3 is sometimes called a reduction optics system, because the image 307 is typically reduced in size as compared with scan line 302. This kind of optical system has the advantage that it provides good depth of field. That is, objects a significant distance above platen 102 can still be imaged with good clarity. However, a reduction optics system is often bulky, and it is difficult to make a compact scanner using a reduction optics system as shown in FIG. 3.

Scan line 302 is not a line in the mathematical sense, but has some width. The actual width depends on the magnification of the optical system, the size of the pixels on sensor 308, how many rows of sensors are present on sensor 308, and if there are multiple rows, the spacing between the rows. It is convenient to refer to a "scan line" since scan line 302 is very narrow in relation to its length, even though several parallel rows of pixels may sense light from scan line 302.

In many scanners, some means is provided for sensing the color of each part of original item 101. In one method of sensing color multiple sets of sensor pixels are provided, each set having a filter so that the set is responsive to only a portion of the visible light spectrum. The visible spectrum includes wavelengths between about 0.4 and 0.7 microns. For example, three sets of pixels may respond to red, green, and blue light wavelengths. The digital values from the three sets are combined into a color digital image of original item 101. In another method, a single set of pixels is responsive to substantially all visible light wavelengths, but multiple exposures are made, each exposure using light made up of only a portion of the visible spectrum. For example, three exposures may be made, one each with a red illuminant, a green illuminant, and a blue illuminant. The digital values from the three exposures are combined to form a color digital image of original item 101.

Figure 4A:
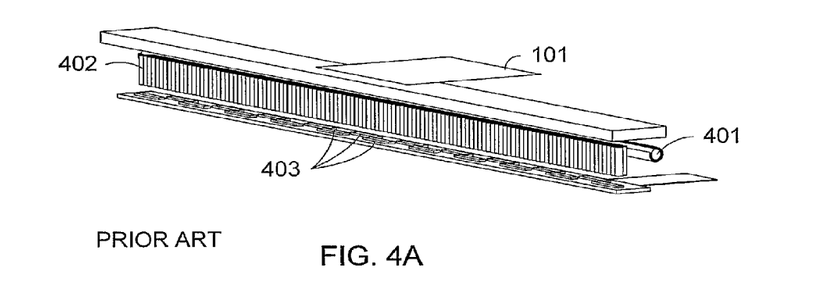
FIGS. 4A and 4B shows an alternative optical system.
Figure 4B:
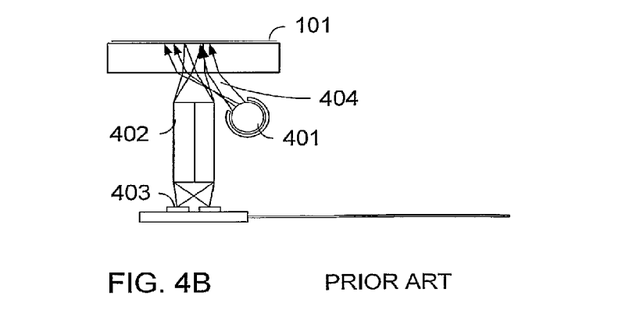

FIGS. 4A and 4B show an alternative optical system often called a contact image sensor (CIS). Light 404 from lamp 401 reflects from original item 101 and is gathered by an array of gradient index rod lenses 402. Lenses 402 form a composite image of the original item on an array of sensor segments 403. Image data read by sensor segments 403 are assembled into a single digital image of original item 101. A CIS system has the advantage that it is compact, and a scanner using a CIS system can be made correspondingly small. However, a CIS system such as is shown in FIG. 4 provides very little depth of field because the image it forms is of unit magnification and because the images formed by the individual rod lenses 402 are misaligned at positions away from the object and image planes. Objects as near as 0.5 millimeters away from platen 102 may appear blurry when imaged by a CIS system. And because the image formed by lenses 402 is of unit magnification, a costly page-wide array of sensors 403 is needed.

Each conventional architecture has advantages and disadvantages that have been weighed against each other in the design of previous scanners. While these alternative architectures have been presented in the context of a flatbed scanner scanning a reflective original item 101, similar tradeoffs occur in the design of other kinds of products as well, for example in the design of multi-function products that can scan, print, copy, and perform other functions, in the design of scanners that can scan photographic slides and other transmissive original items, and in the design of "sheet feed" scanners and facsimile machines wherein the scanning optics and sensors are held stationary while an original item is transported past for scanning.

DETAILED DESCRIPTION

Figure 5A:
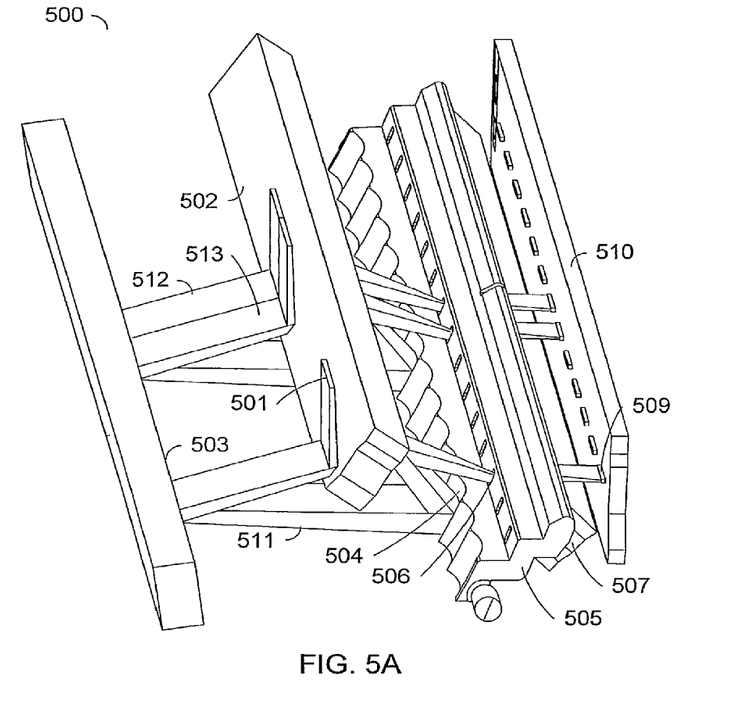
FIGS. 5A and 5B show upper and lower perspective views of a scanner optical system in accordance with an example embodiment of the invention.
Figure 5B:
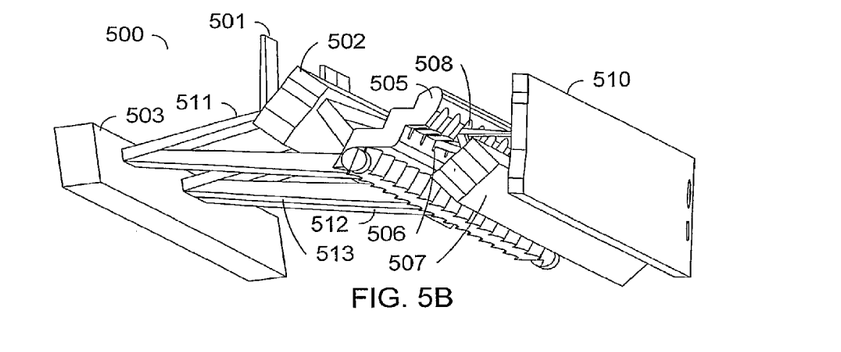

FIGS. 5A and 5B show upper and lower perspective views of a scanner optical system 500 in accordance with an example embodiment of the invention. Optical system 500 comprises multiple image-forming channels, each channel imaging a portion of a scan line. In the example of FIGS. 5A and 5B, 15 channels are used, although more or fewer may be used.

Each image-forming channel gathers light from of a segment of the page-wide scan line, and redirects it to form an image of that segment on a sensor. In FIGS. 5A and 5B, the volumes swept by image-forming light in three channels are shown; the others are omitted for clarity of illustration. Taking one particular channel as an example, light from scan line segment 501 (reflected from or transmitted through an original item not shown) reflects from page-wide generally planar mirrors 502 and 503. Each of the planar mirrors is preferably a first-surface mirror made from a glass substrate having a reflective aluminum coating layer deposited on the reflecting surface or surfaces. Example mirror 502 is reflective on both sides. After reflecting from mirror 503, the light then reflects from first non-planar mirror segment 504 on multi-purpose optical element 505. The light then reflects again from mirror 502, this time from the side opposite the side of the first reflection. The light then passes through optical aperture 506. For the purposes of this disclosure, an optical aperture is an opening through which all of the image-forming rays of an image-forming system pass by design, and which determines the numerical aperture of the system. After passing through optical aperture 506, the light reflects from page-wide planar mirror 507, and then from second non-planar mirror segment 508 on multi-purpose optical element 505. An image of scan line segment 501 is formed on a generally linear electronic light sensor segment 509, which is mounted on circuit board 510. Light path 511 illustrates the volume swept by the image-forming light from scan line segment 501. Light paths 512 and 513 illustrate the volumes swept by image-forming light from two other scan line segments in two other channels. The planar and non-planar mirrors in the system serve to "fold" the light paths for compactness. And in the cases of the reflections immediately preceding and following the light passing through the aperture, the planar mirrors also serve to locate the image-forming optics within an optical subassembly. (The light paths shown in FIGS. 5A and 5B are approximate. Optical aperture 506 is preferably a circular opening, and therefore in actuality each light path will preferably have rounded sides. The paths are shown with corners for ease of illustration.) Each of the other 12 channels has an associated light path not shown.

Multi-purpose optical element 505 comprises, for each image-forming channel, an aperture and first and second non-planar mirror segments. These components are nominally identical for each channel. Element 505 is preferably injection molded of an acrylic copolymer or another thermoplastic, and the mirrored surfaces made reflective by vacuum deposition of aluminum. One suitable copolymer is NAS, which is manufactured by Nova Chemicals of Fribourg, Switzerland, and which is nominally about 30 percent acrylic and 70 percent polysturene. Element 505 may be made of other materials, by other processes, or both. For example, element 505 could be die cast from aluminum, and the reflective surfaces diamond machined to give them their final shape and reflectivity.

Figure 6:
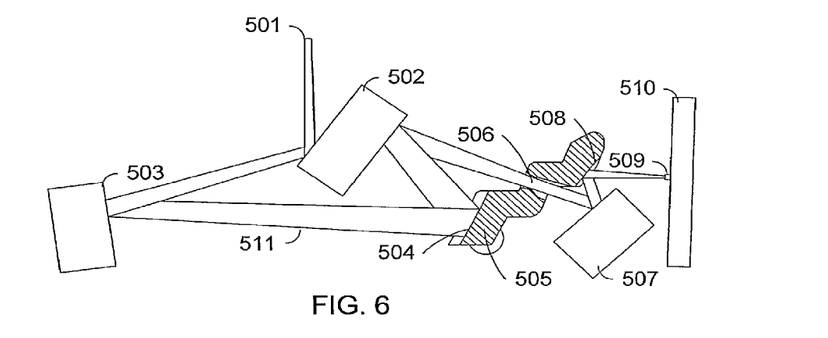
FIG. 6 shows a cross section of one channel of the optical system of FIG. 5 in greater detail, in accordance with an example embodiment of the invention.

FIG. 6 shows a cross section of one image-forming channel in greater detail. Non-planar mirror segment 504 is preferably, but not necessarily, aspheric, while non-planar mirror segment 508 is preferably, but not necessarily, a segment of a sphere. The locations and shapes of these two surfaces, in conjunction with location of optical aperture 506 and the locations of mirrors 507 and 502 determine the image-forming characteristics of the system. Preferably the components are positioned so that each channel has an optical magnification of less than unity. In one example embodiment, each channel has a nominal magnification of 0.5. That is, the image formed at sensor 509 is nominally half the size of the object at scan line 501. Furthermore, the system is preferably telecentric in object space. That is, the chief rays emanating from all points along scan line segment 501 are substantially parallel to each other. In practice, the benefits of telecentricity are realized when the chief rays of the outermost pencils of each image-forming channel are within about 1.5 degrees of parallel to the optical axis of the channel. Such a system can be designed using well-known optical design techniques.

Each sensor segment, exemplified by sensor segment 509, may be a CCD sensor, or another kind of sensor. For example, each sensor segment may be an active pixel complementary metal oxide semiconductor (CMOS) sensor. When the optical magnification of each channel is less than unity, less sensor material is used as compared with a unity-magnification CIS module. The total cost of the sensor material is therefore also reduced. In the example of FIGS. 5A and 5B, only about half as much sensor material is used than would be used in a page-wide CIS module, because the optical magnification of each channel in the system of FIGS. 5A and 5B is 0.5.

For the purposes of this disclosure, a sensor segment is "generally linear" when its photo sites are arranged in one or a small number of rows, and the active sensor area is much larger in length than width. For example, a generally linear sensor may have six rows of photosites—three rows comprising high-resolution photosites sensitive to red, green, and blue light respectively, and three rows comprising low-resolution photosites sensitive to red, green, and blue light respectively. Each row may comprise hundreds or thousands of pixels, so the ratio of the length of the active sensor area to the width may exceed 25:1 or more. Some generally linear sensors may comprise 16 or more rows of photosites for sensing light of various wavelength ranges and for scanning at different resolutions. (In this context, "resolution" refers to the number of digital values used to represent an area of the original item, and not to optical resolving power.) Furthermore, the term "generally linear" encompasses sensors with rows that are nominally straight (but may deviate from perfect straightness due to manufacturing imperfections, mounting stresses and the like), and also encompasses rows that are intentionally curved somewhat, for example to compensate for optical distortion in the image-forming optics of a scanner.

Because the optical system of each image-forming channel is substantially telecentric in object space, the images formed by the different channels do not significantly confound with each other, even when scanning objects that are not placed exactly at the platen. This phenomenon enables significantly improved depth of field as compared with a CIS-based scanner. The depth of field is further affected by the numerical aperture of the optical system in object space. The smaller the numerical aperture, the greater the depth of field. In the example embodiment of FIG. 6, the numerical aperture in object space is approximately 0.2.

Each channel of example optical system 500 images a scan line portion using reflective optical surfaces and without the use of refractive elements having optical power. Some refraction may occur at the scanner platen, and each sensor segment may have a transparent cover at which some refraction occurs. However, for the purposes of this disclosure, such flat surfaces are not considered to have optical power, and refraction at such flat surfaces is not considered part of the image forming process. While example optical system 500 accomplishes imaging using only reflective surfaces and without the use of refractive elements having optical power, a system may be envisioned that uses a combination of reflective and refractive elements for image forming. The appended claims are intended to encompass such a system.

Figure 7:
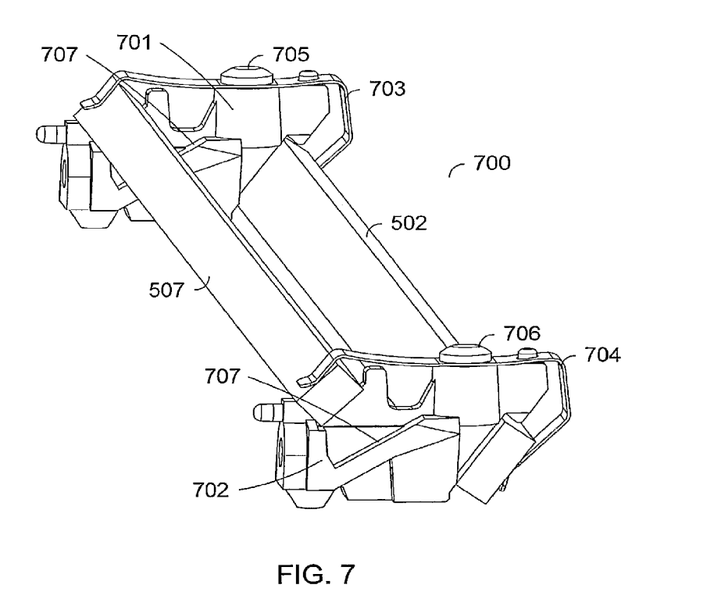
FIGS. 7-13 show a method and apparatus for constructing a scanner carriage, in accordance with an example embodiment of the invention.
Figure 8:
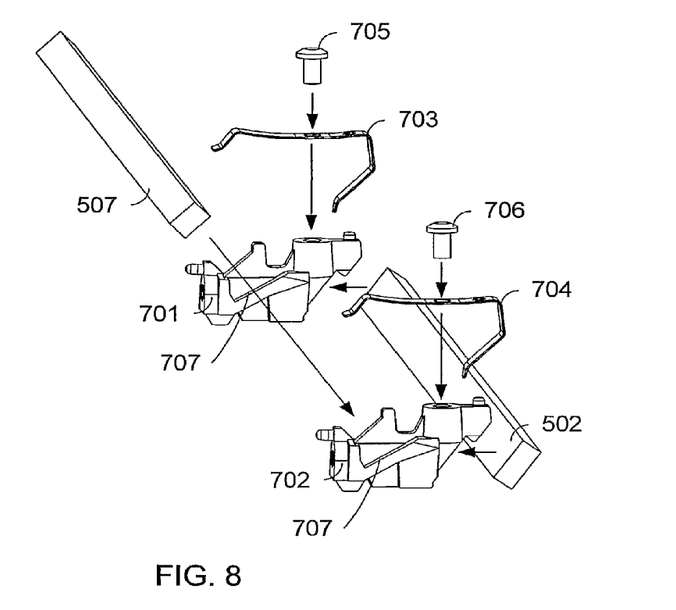

FIGS. 7-13 show a method and apparatus for constructing a scanner carriage, in accordance with an example embodiment of the invention. Because the shape and locations of multi-purpose optical element 505 and mirrors 502 and 507 determine the image-forming characteristics of the system, it is convenient to treat them and some mounting components as an optical subassembly. FIG. 7 shows mirrors 502 and 507 mounted to two end datum blocks 701 and 702, forming optical subassembly 700. Note that the assembly is inverted from the position shown in the previous figures. That is, subassembly 700 is "upside down" in FIG. 7, as compared with its normal operating position. Spring clips 703 and 704 hold mirrors 502 and 507 against mirror mounting surfaces on end datum blocks 701 and 702, and are secured by screws 705 and 706. FIG. 8 shows an exploded view of the example mirror subassembly 700. End datum blocks 701 and 702 are preferably identical and symmetrical and made of substantially clear polycarbonate, acrylic, or another thermoplastic. Each datum block further comprises datum surfaces 707 for later mounting of multi-purpose optical element 505. Because example datum blocks 701 and 702 are symmetrical, each comprises a corresponding datum surface on the opposite side not visible in the figure.

Figure 9:
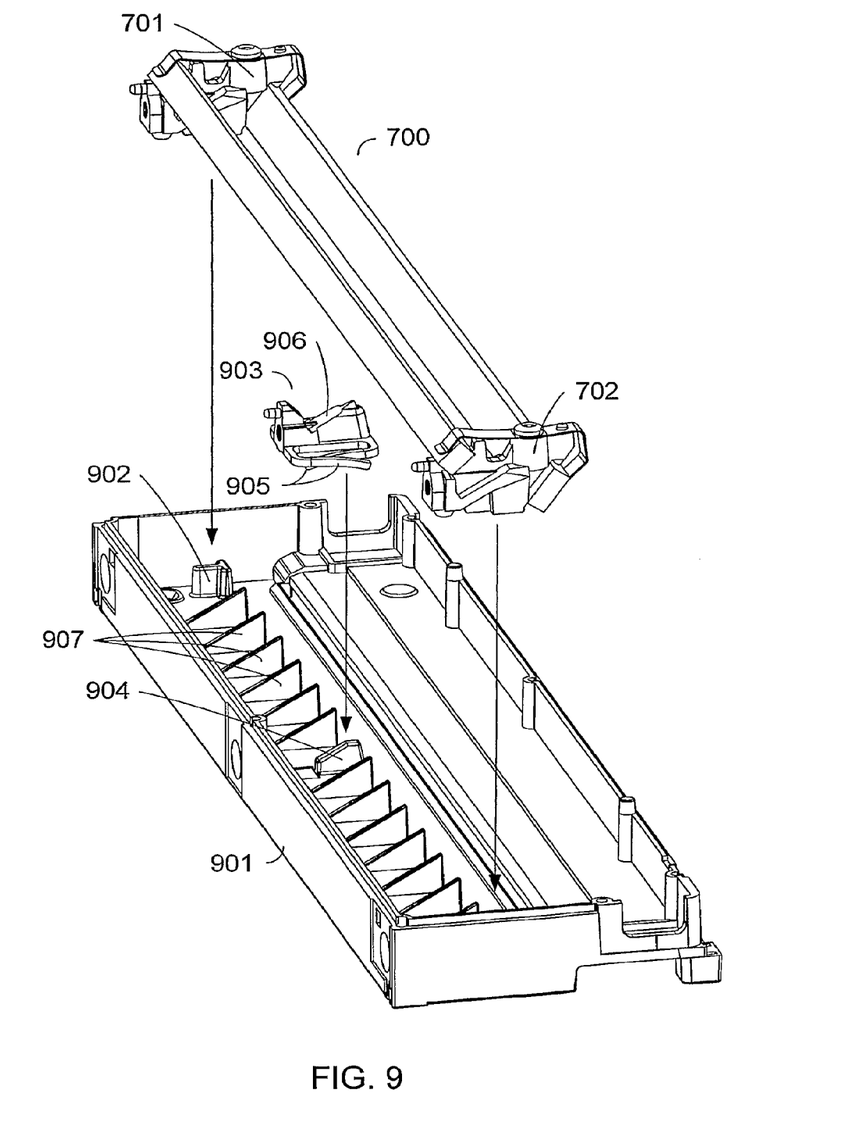

FIG. 9 illustrates the assembly of subassembly 700 into a carriage housing 901, in accordance with an example embodiment of the invention. Housing 901 comprises bosses 902, which nest into pockets molded into end datum blocks 701 and 702. (Only the boss corresponding to datum block 701 is visible in the figure.) Preferably, before subassembly 700 is placed into housing 901, an adhesive is placed on each of bosses 902, the adhesive to be cured later by application of light, either ultraviolet (UV) or visible. Other attachment methods are possible as well. For example, end datum blocks 701 and 702 may be held in carriage housing 901 using screws, snaps, heat welds, or some other attachment method. Datum blocks held in carriage housing 901 by means other than light-curable adhesive need not be clear, and may be made from any of a wide variety of materials, including plastics or metals.

Optionally, a middle datum block 903 is placed into housing 901 as well. Middle datum block 903 is also preferably molded of substantially clear polycarbonate, acrylic, or another thermoplastic, and includes a pocket for engaging boss 904 comprised in housing 901. Before middle datum block 903 is placed into housing 901, light-curable adhesive is preferably placed on boss 904. Middle datum block 903 comprises spring features 905, which bias middle datum block 903 away from housing 901. Spring features 905 facilitate an alignment procedure to be described shortly. Middle datum block 903 further comprises a datum surface 906.

Wedge-shaped features 907 in housing 901 serve as light baffles, and help to reduce optical "crosstalk" between optical channels.

Figure 10:
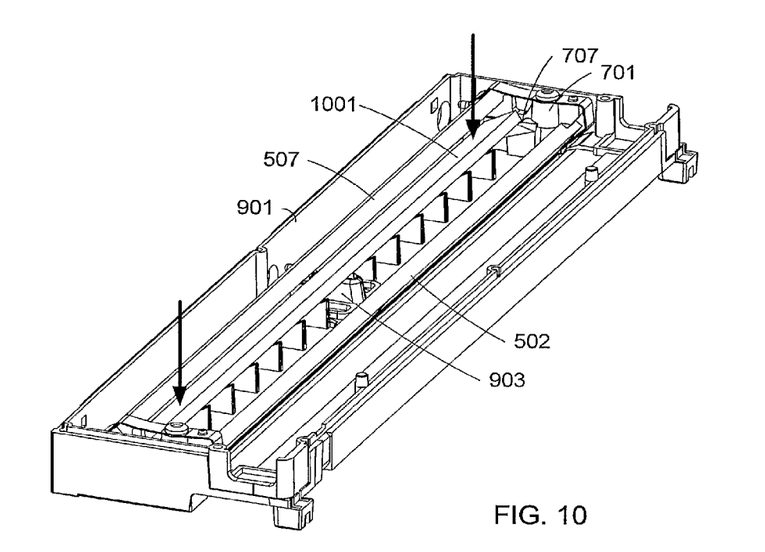
Figure 11:
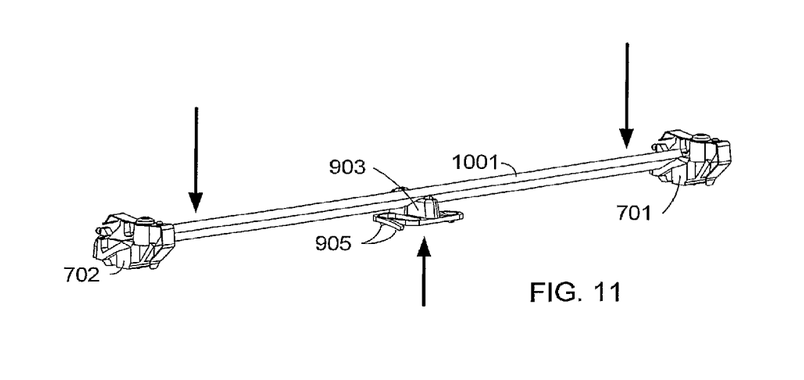

FIG. 10 shows optical subassembly 700 and middle datum block 903 assembled into carriage housing 901, in accordance with an example embodiment of the invention. FIGS. 10 and 11 also show a process in accordance with an example embodiment of the invention for aligning middle datum block 903. Mirrors 502 and 507 and housing 901 have been omitted from FIG. 11 for clarity. Alignment bar 1001 is part of an alignment fixture, and is substantially rigid and comprises a substantially planar face that contacts datum surfaces 707 on end datum blocks 701 and 702, and also contacts datum surface 906 (not visible in FIGS. 10 and 11) on middle datum block 903. Alignment bar 1001 may be, for example, machined from stainless steel and the substantially planar surface ground to achieve good flatness. Alignment bar 1001 is held against datum surfaces 707, preferably by weights heavy enough to achieve good contact with end datum blocks 701 and 702, but light enough so that no significant distortion of alignment bar 1001 occurs. Spring features 905 on middle datum block 903 press against housing 901, thereby pressing datum surface 906 of datum block 903 against alignment bar 1001. In this state, the three datum surfaces 906 and 707 are substantially coplanar.

Once the three datum blocks 701, 702, and 903 are aligned, they are flooded with light, curing the adhesive previously placed between housing 901 and each datum block 701, 702, and 903. The cured adhesive then holds the parts in their relative positions. Alignment bar 1001 can then be removed.

Figure 12:
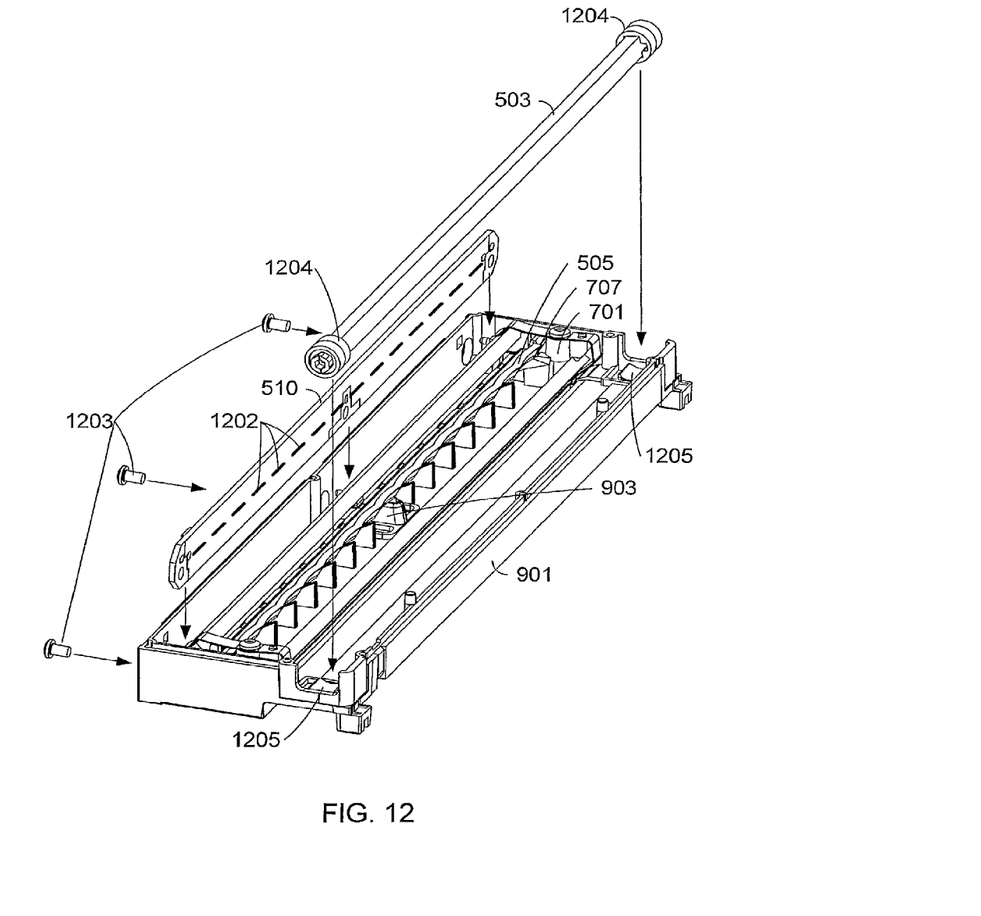

FIG. 12 illustrates the assembly of some other components into carriage housing 901, in accordance with an example embodiment of the invention. Multi-purpose optical element 505 rests on datum surfaces 707 and 906. (Surface 906 is not visible in FIG. 12.) Because the three datum surfaces have been aligned, middle datum block 903 provides an accurate reference near the middle of multi-purpose optical element 505. This referencing of optical element 505 to surface 906 aids in keeping optical element 505 straight, which may be especially important when optical element 505 is made of molded plastic and is therefore relatively flexible in comparison with the mirrors. Means for holding multi-purpose optical element in position against datum surfaces 707 and 906 will be described later.

Circuit board 510, comprising sensors 1202, registers to datum blocks 701, 702, and 903, and is secured to them by screws 1203. Mirror 503 is preferably mounted in such a way as to allow some adjustment in its position. In the example of FIG. 12, clear hubs 1204 are attached to mirror 503, and rest in journals 1205. After adjustment, hubs 1204 and journals 1205 may be fixed using light-curable adhesive, thus fixing mirror 503 in place.

Figure 13:
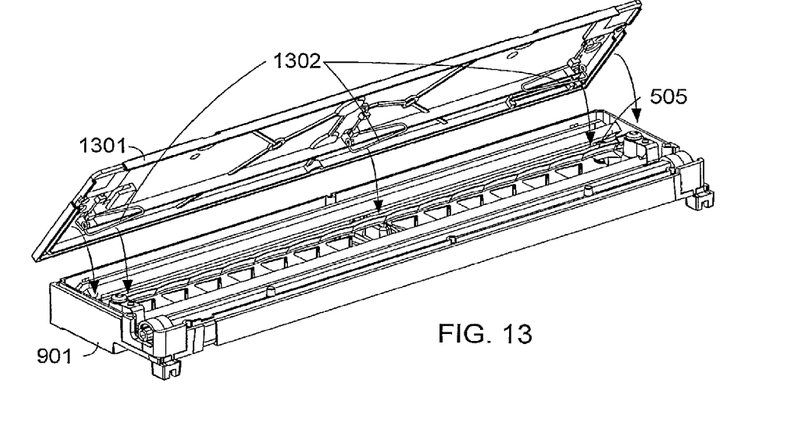

FIG. 13 illustrates a carriage lid 1301 in position to attach to carriage housing 901. Springs 1302 clip into carriage lid 1301 and retain multi-purpose optical element 505 when lid 1301 is in position. Lid 1301 is preferably secured to housing 901 using screws (not shown). Note that the carriage is still in its "upside down" orientation in FIG. 13. Openings in the carriage, for example holes for access to screws or adjustments, may be sealed using thin adhesive sheets (not shown).

Figure 14:
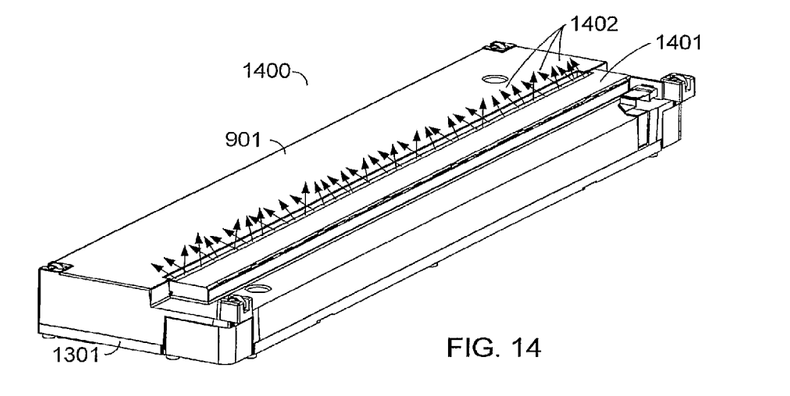
FIG. 14 shows a completed carriage module, in accordance with an example embodiment of the invention.

FIG. 14 shows the completed example carriage module 1400 in its normal operation orientation. A light source 1401 provides light 1402 directed at the scan line. Light source 1401 may comprise one or more lamps, mirrors, lenses, light pipes, light guides, diffuse reflectors, concentrators, lens arrays, diffractive elements, other optical elements, or any of these in any combination. For example, light source 1401 may comprise a broad-spectrum cold cathode fluorescent lamp, which emits light containing substantially all wavelengths in the visible spectrum. In that case, if color scanning is to be performed, then each sensor segment such as sensor 509 may comprise multiple rows of pixels, each row sensing light in a subset of the visible spectrum. The subsets may overlap.

Preferably, light source 1401 comprises at least three devices that emit light of at least three different colors and that can be switched on and off singly or in combinations. Each "color" of light comprises light containing wavelengths in a subset of the visible spectrum. The subsets may overlap. Preferably, the light emitting devices are light emitting diodes (LEDs). For example, illumination module 1401 may comprise one LED that emits generally red light, one that emits generally green light, and one that emits generally blue light. The light may be distributed nearly uniformly along the length of the scan line using one or more light pipes, diffusers, lenses, reflectors, or other means. In this case, the sensor segments are sensitive to substantially the entire visible spectrum. Color scanning is accomplished by reading each scan line multiple times, at least once with each different illumination color, and then combining the multiple readings into a color image. Of course, more than one of each LED color may be used. For example, two or more red LEDs, two or more green LEDs, and two or more blue LEDs may be operated in concert. A different number of LEDs may be used for one illumination color than for another.

More than three illuminant colors may be used. For example, at least one LED of each of six different LED colors may be used to accomplish more accurate color rendition.

Color scanning using multiple illuminant colors may be "single-pass" or "multiple-pass". In single-pass color scanning, each scan line is read using each illuminant color before the scanning mechanism is moved to the next scan line. In multiple-pass scanning, multiple scan lines (up to the entire scan area) are scanned with only one illuminant color, the scanning mechanism is retracted, the scan lines are scanned with only a second illuminant color, and so forth.

When multiple illuminant colors, for example multiple LEDs, are used, rapid black-and-white (also sometimes called "monochrome" or "grayscale") scanning may be performed by turning on all LEDs simultaneously. The increased light intensity, as compared with using only one illuminant color at a time, may enable shortening of the exposure time used for reading each successive scan line, and therefore may enable moving the scanning mechanism at a faster scan speed.

The module of FIG. 14 may be assembled into an imaging device. The imaging device may be a flatbed scanner, a sheet-feed scanner, a multi-function or "all-in-one" peripheral product, a facsimile machine, a copier, or any other device that performs image scanning. The product may be capable of scanning reflective originals, transmissive originals (also called "transparencies") such as 35 millimeter photographic slides, three-dimensional objects, or any of these and other types of originals in any combination. The imaging device may cause relative motion between the original and module 1400 in any of several ways. For example, module 1400 may be moved while the original is held stationary, or the original may be moved while module 1400 is held stationary, or both the original and module 1400 may move during scanning.

Figure 15:
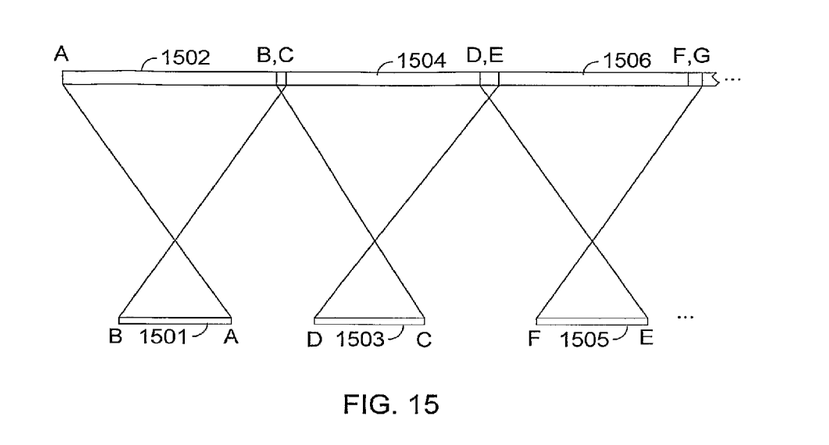
FIG. 15 illustrates channel overlap, in accordance with an example embodiment of the invention.

Preferably, in an optical module according to an example embodiment of the invention, the fields of view of adjacent image-forming channels overlap by a small amount. FIG. 15 illustrates this channel overlap in a schematic diagram of three example channels. In FIG. 15, sensor segment 1501 "sees" scan line segment 1502. End "A" of sensor segment 1501 views end "A" of scan line segment 1502, while end "B" of sensor segment 1501 views end "B" of scan line segment 1502. Similarly, sensor segment 1503 sees scan line segment 1504, and sensor segment 1505 sees sensor segment 1506. Small errors in the placement of the sensor segments, inherent in the process of manufacturing the circuit board on which the sensor segments are mounted, may cause variations in the fields of view of the sensor segments. Manufacturing and assembly variability in the optical parts may cause similar variations. The amount of overlap between scan line segments is determined in part by the system magnification, the accuracy with which sensor segments can be placed and the accuracy of fabrication and assembly of the optical parts. Preferably, each overlap region is less than one percent of the length of each scan line segment. In FIG. 15, sensor segment 1503 is placed slightly to the left of its nominal position, which would be exactly halfway between sensor segments 1501 and 1505. As a result, the overlap between scan line segments 1502 and 1504, including segment ends B and C, is smaller than the overlap between scan line segments 1504 and 1506, which includes segment ends D and E. Without the intentional overlap of the respective fields of view, part of the original item could be missed during a scan, and part could be scanned redundantly. The overlap in segment fields of view creates intentional redundancy. Pixel values scanned from the overlap regions may be selectively ignored or combined to create a seamless image. Techniques for determining the degree of actual overlap and for compensating for it are well known in the art.

Figure 16:
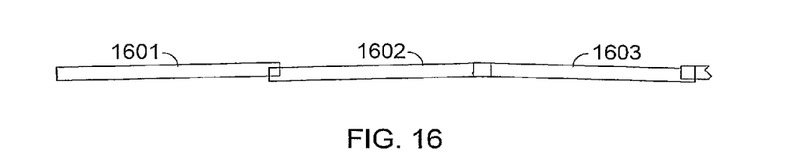
FIG. 16 shows angular misalignment of scan line segments, in accordance with an example embodiment of the invention.
Figure 17:
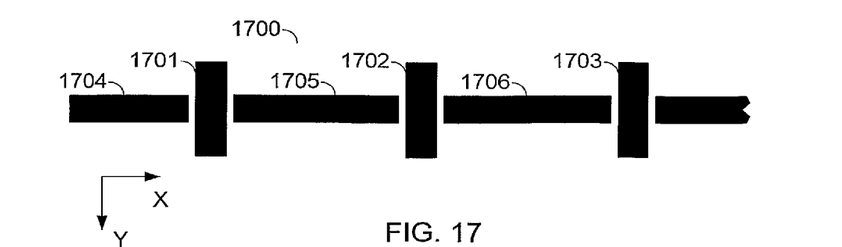
FIG. 17 shows a calibration target, in accordance with an example embodiment of the invention.

Sensor segment placement errors and optical part manufacturing and assembly errors may also result in angular misalignment of scan line segments, as shown in FIG. 16. In FIG. 16, example scan line segments 1601, 1602 and 1603 are not collinear as viewed from above a scanner platen, and also have varying degrees of overlap. If uncorrected, these angular misalignments can cause apparent discontinuities in a scanned image. Proper calibration and adjustment of pixel values can compensate for the misalignments, reducing or eliminating these artifacts. Techniques for performing such calibration and adjustment are also known in the art. For example, a calibration target may be scanned, and the resulting digital image analyzed to determine the state of alignment of the sensor segments. FIG. 17 shows a calibration target 1700, in accordance with an example embodiment of the invention. The apparent locations of vertical edges 1701, 1702, 1703 and horizontal edges 1704, 1705, 1706 in a digital image scanned by the scanner being calibrated reveal positional and angular misalignments of the sensor segments. The pixels values in each subsequent scanned image may then be adjusted to reduce or eliminate the effects of the misalignment.

Figure 18:
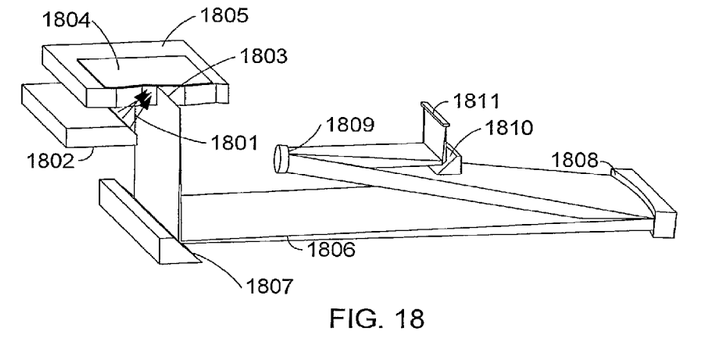
FIG. 18 illustrates one channel of an arrangement of optical components and a light path in accordance with another example embodiment of the invention.

FIG. 18 illustrates one channel of an arrangement of optical components and a light path in accordance with another example embodiment of the invention. One of skill in the art will envision support structures and appropriate baffling for such an arrangement. These parts are omitted from the figure for clarity. In this example embodiment, light 1801 from light source 1802 illuminates a scan line 1803 on an original 1804, which rests on platen 1805. (In FIG. 18, a reflective original 1804 is being scanned, but such a system may also scan a transmissive original with proper placement of a light source.) Image-forming light reflected from original 1804 follows light path 1806, reflecting from planar mirror 1807. Mirror 1807 may be page-wide. The light then reflects from non-planar mirror segment 1808 and non-planar mirror segment 1809. In this embodiment, non-planar mirror segment 1809, while not an optical aperture, serves the function of an optical aperture, limiting which image-forming light rays continue through the system and therefore limiting the numerical aperture of the system. The image-forming light then reflects from planar mirror 1810, which also may be page-wide, and reaches sensor segment 1811, which is mounted on a printed circuit board (not shown for clarity). The optical system of FIG. 18 is preferably substantially telecentric in object space, and preferably has an optical magnification of less than unity. Such a system may be designed using well-known techniques. The system of FIG. 18 may be replicated in a scanner carriage, providing a number of channels for scanning originals wider than the single illustrated channel. Preferably, the scan line segments scanned by adjacent channels overlap.

The invention claimed is:

1. An optical carriage module for a scanner, comprising:
   at least two page-wide generally planar mirrors;
   a page-wide optical element comprising a plurality of non-planar mirrors, each of the non-planar mirrors corresponding to a discrete image-forming optical channel associated with the scanner, the discrete image-forming optical channel reflecting from each of the two page-wide generally planar mirrors;
   at least two end datum blocks comprising mirror mounting surfaces for mounting the page-wide generally planar mirrors and an element mounting surface for mounting the page-wide optical element;
   at least one spring clip for each end datum block, each spring clip holding the at least two page-wide mirrors against an end datum block; and
   a carriage housing;
   and wherein the page-wide mirrors, the end datum blocks, and the clips are comprised in an optical subassembly that is secured to the carriage housing.

2. The optical carriage module of claim 1, wherein the end datum blocks are substantially clear and are secured to the carriage housing using an adhesive cured by application of light.

3. The optical carriage module of claim 1, wherein the page-wide optical component is substantially flexible, the method further comprising:
   a middle datum block having a datum surface referencing the substantially flexible page-wide optical component;
   a datum surface on each end datum block referencing the substantially flexible page-wide optical component.

4. The optical carriage module of claim 3, further comprising at least one spring feature on the middle datum block, the at least one spring feature configured to hold the datum surface of the middle datum block against an alignment fixture while the middle datum block is secured to the carriage housing using an adhesive.

5. The optical carriage of claim 4, wherein after curing of the adhesive, the datum surfaces on the end datum blocks and the datum surface on the middle datum block are substantially coplanar.

6. The optical carriage module of claim 3, further comprising:
   a lid; and
   at least one spring interposed between the lid and the substantially flexible page-wide optical component, the at least one spring holding the substantially flexible page-wide optical component against at least one datum surface.

7. A method of assembling an optical carriage module for a scanner, comprising:
   securing at least two page-wide generally planar mirrors against first mounting surfaces on two end datum blocks using at least one spring clip for each datum block;
   securing a page-wide optical component against a second mounting surface on the two end datum blocks, the page-wide optical element comprising a plurality of non-planar mirrors that each correspond to a discrete image-forming optical channel associated with the scanner, the discrete image-forming optical channel reflecting from each of the at least two page-wide generally planar mirrors; and
   securing the two end datum blocks comprising the at least two page-wide generally planar mirrors and the page-wide optical component as an optical subassembly into a carriage housing.

8. The method of claim 7, wherein securing the two end datum blocks further comprises:
   placing an adhesive between each end datum block and the carriage housing;
   and curing the adhesive by flooding it with light through the end datum blocks.

9. The method of claim 7, wherein each end datum block comprises a datum surface, the method further comprising:
   holding an alignment fixture against the datum surfaces of the end datum blocks;
   placing a middle datum block between the end datum blocks, the middle datum block having a datum surface and at least one spring feature that holds the middle datum block datum surface against the alignment fixture;
   securing the middle datum block to the carriage housing using an adhesive; and
   securing the page-wide optical component to the middle datum block.

10. The method of claim 9, wherein after the middle datum block is secured to the carriage, the datum surfaces of the end datum blocks and the datum surface of the middle datum block are substantially coplanar.

\* \* \* \* \*

UNITED STATES PATENT AND TRADEMARK OFFICE
CERTIFICATE OF CORRECTION

| | | |
|---|---|---|
| PATENT NO. | : 8,482,819 B2 | Page 1 of 1 |
| APPLICATION NO. | : 13/686565 | |
| DATED | : July 9, 2013 | |
| INVENTOR(S) | : Jack H Schmidt et al. | |

It is certified that error appears in the above-identified patent and that said Letters Patent is hereby corrected as shown below:

In the Claims:

In column 9, line 35, in Claim 1, delete "page- wide" and insert -- page-wide --, therefor.

In column 10, line 47, in Claim 9, after "block" insert -- and --.

Signed and Sealed this
Twenty-fourth Day of September, 2013

Teresa Stanek Rea
*Deputy Director of the United States Patent and Trademark Office*